United States Patent [19]

Dontscheff

[11] Patent Number: 4,461,669
[45] Date of Patent: Jul. 24, 1984

[54] PIVOTAL MOUNT FOR LAMINATING HEAD

[75] Inventor: Helmut Dontscheff, Tacoma, Wash.

[73] Assignee: The Boeing Company, Seattle, Wash.

[21] Appl. No.: 537,982

[22] Filed: Sep. 30, 1983

[51] Int. Cl.³ .............................................. B32B 31/00
[52] U.S. Cl. .................................. 156/574; 156/486; 156/577
[58] Field of Search ............... 156/350, 351, 353, 355, 156/361, 425, 523–527, 522, 574–577, 71, 543; 425/162–163, 375

[56] References Cited

U.S. PATENT DOCUMENTS

| | | | |
|---|---|---|---|
| 3,752,728 | 8/1973 | Smirnov | 156/577 |
| 3,775,219 | 11/1973 | Karlson et al. | 156/526 X |
| 3,810,805 | 5/1974 | Goldsworthy et al. | 156/525 X |
| 3,975,226 | 8/1976 | Boettcher | 156/361 X |
| 4,133,711 | 1/1979 | August | 156/313 |
| 4,239,580 | 12/1980 | Ives | 156/575 X |
| 4,292,108 | 9/1981 | Weiss et al. | 156/353 X |
| 4,419,170 | 12/1983 | Blad | 156/523 X |

*Primary Examiner*—David A. Simmons
*Attorney, Agent, or Firm*—Joan H. Pauly; Delbert J. Barnard

[57] ABSTRACT

A tape laying head (4) has a presser roller (20) spaced below a support post (32), which is a part of the carriage of a contour tape laying machine (2). The longitudinal axis of post (32) is aligned with a point on tape path (22). Parallel linkage (36) mounts head (4) and roller (20) on post (32) and allows them to pivot relative to post (32) about path (22). Linkage (36) includes two opposite side posts (38, 44) parallel to post (32), and two levers (40, 42) connecting posts (38, 44) to post (32). Side posts (38, 44) are pivotably connected to head (4). Springs (62) may be provided to balance head (4) in any pivotal position. A motor (64) may also be provided to pivot lever (40) to in turn pivot head (4).

15 Claims, 7 Drawing Figures

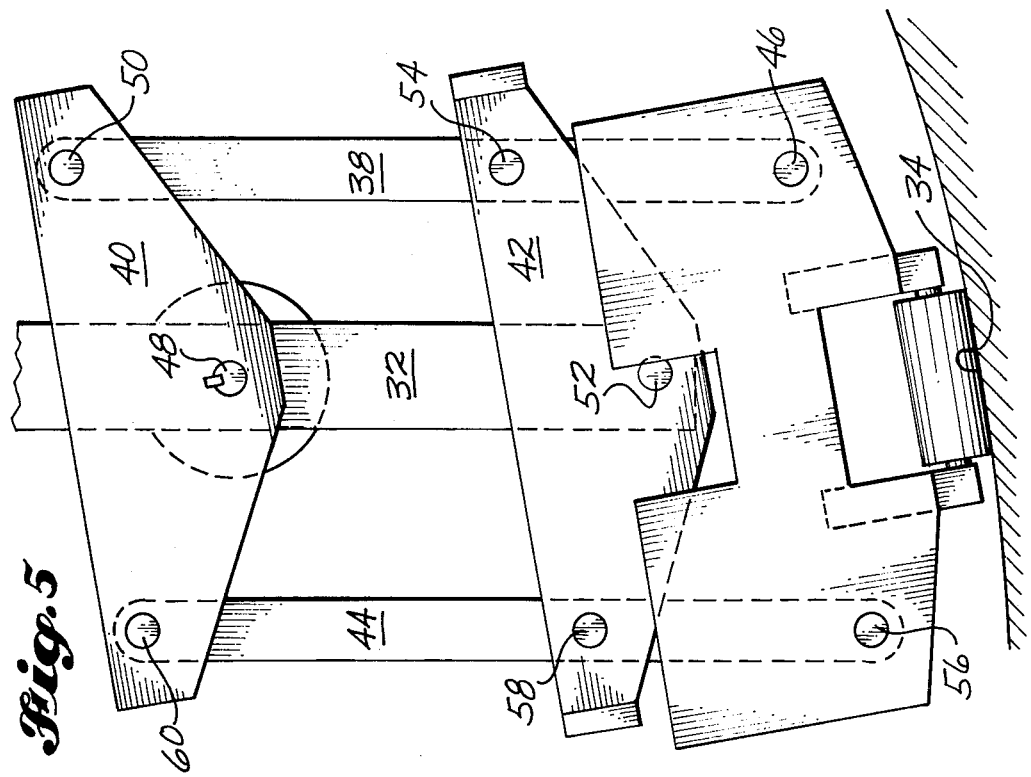
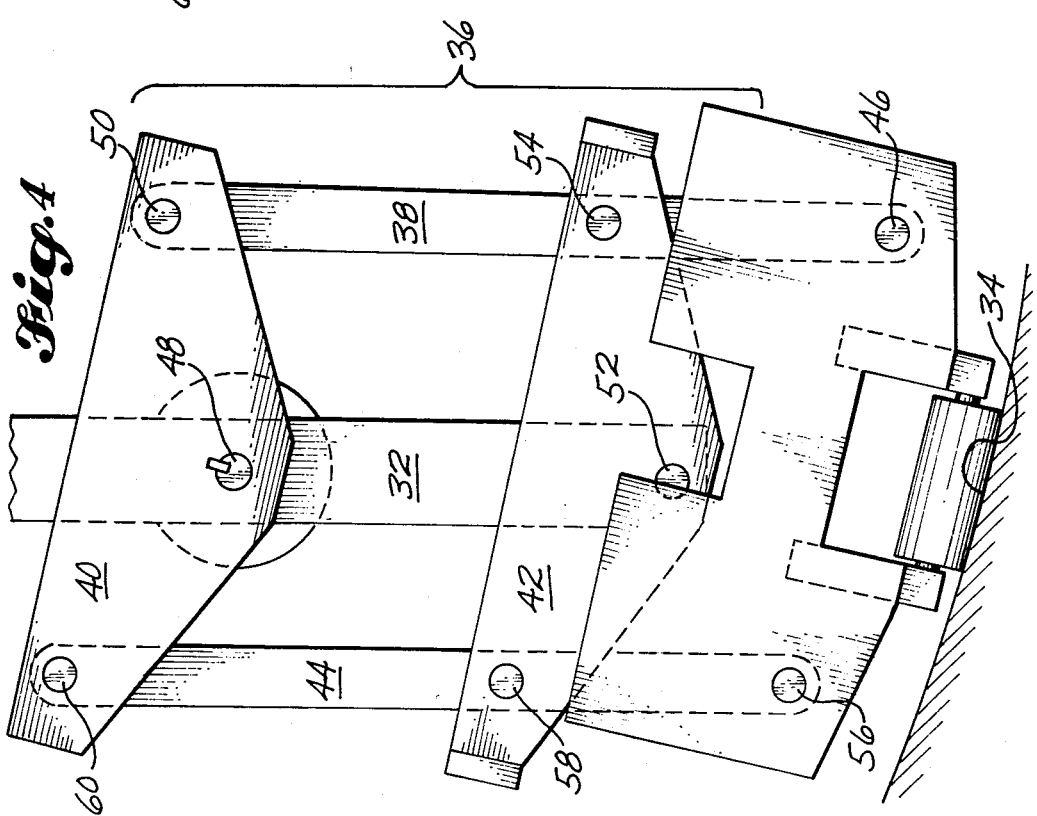

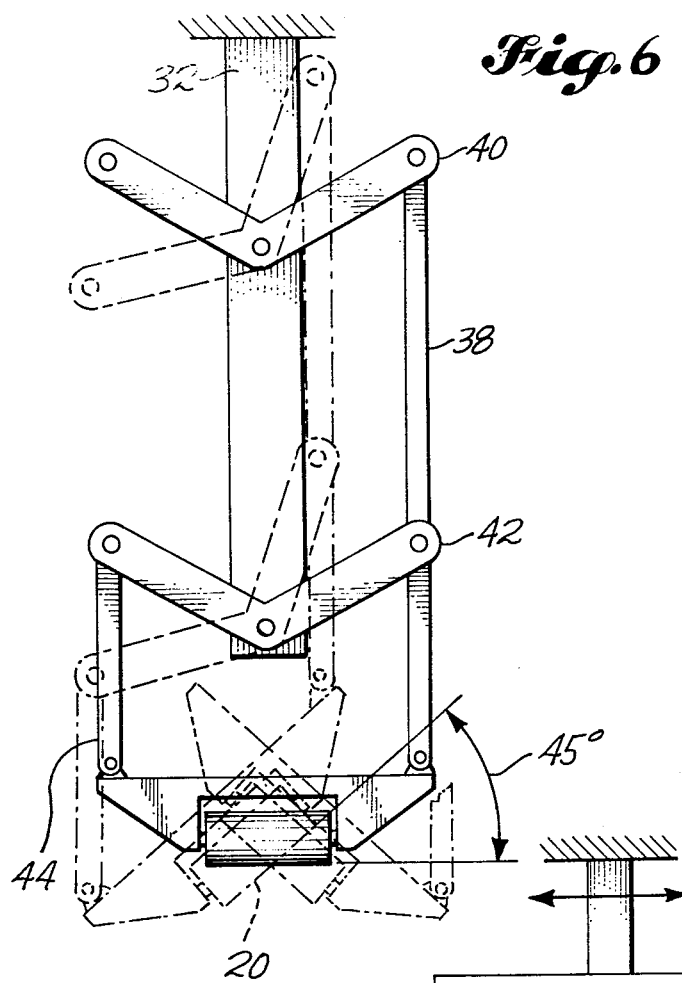
*Fig.*6
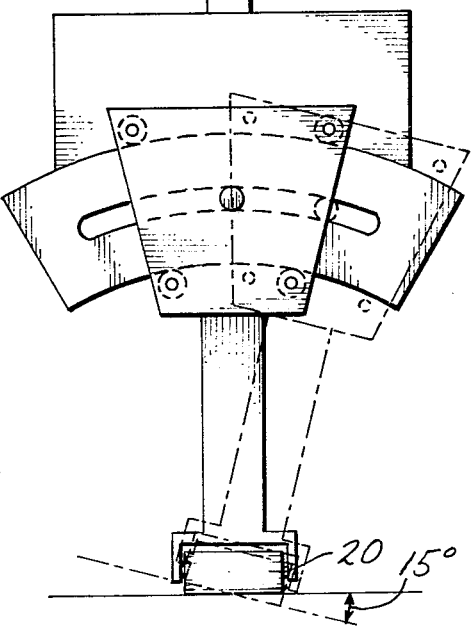
*Fig.*7
PRIOR ART

PIVOTAL MOUNT FOR LAMINATING HEAD

DESCRIPTION

Technical Field

This invention relates to mounting apparatus for the compacting heads of laminating machines and, more particularly, to such apparatus that includes parallel linkage means and that allows pivotal movement of the head about the laminating path.

Background Art

This invention is directed primarily toward providing an improved mounting apparatus for the compacting heads of advanced composite laminating machines. Such machines are used for manufacturing aircraft structures from advanced composite materials. One kind of advanced composite laminating machine that is well known in the art is a tape laying machine that is used for manufacturing such structures from composite tape materials. An example of a particular type of tape laying machine into which the apparatus of the present invention could advantageously be incorporated is the machine developed by the Vought Corporation and described in the Jan. 24, 1983 issue of Design News, in the article on pages 136 and 137 entitled "CNC Machine Slashes Laminated Composite Cost".

When it is desired to use a tape laying machine to manufacture a contoured aircraft structure, the current practice is to first produce a flat skin by the tape laying operation and then to form the flat skin into shape before curing. This practice has the disadvantages of requiring three separate processes (the laying up operation, the forming operation, and the curing operation) and, perhaps more importantly, of stressing the fibers of the composite tape material during the forming operation. The stresses on the fibers are highly undesirable since they can affect the strength and integrity of the finished aircraft component. Therefore, it is highly desirable to be able to lay the tape directly onto a contoured mandrel or mold.

The tape laying head of any tape laying machine must be normal to the surface that is receiving the tape. Therefore, in order to laminate directly onto a contoured surface, the tape laying head must be capable of adapting to the changing angles of the contour without deviating from the programmed path. This requires that the tape laying head be capable of pivoting around the path of the tape as the tape is being applied to the contoured surface. Since the center of the required pivotal motion is on the tape receiving surface, a pivot joint cannot of course be placed at the center of the required motion. Therefore, the process of laminating directly onto a contoured surface presents the basic problem of requiring pivotal motion of a portion of the laminating machine about a point or axis that is not available as a location for a pivot joint.

The Vought machine mentioned above is apparently capable of laminating directly onto a contoured surface but there are numerous disadvantages associated with the approach that has been taken by Vought to solve the problem. In order to provide circular movement of the tape laying head in a plane normal to the direction of travel, the Vought machine includes an arrangement of two steel plates and a swivel ring segment that runs on steel balls between the two steel plates. The plates function as guides for the ring segment. The plates are mounted on the carriage of the tape laying machine, and the ring segment is secured to the tape head. The ring segment moves in an arc between the steel plates to produce the desired pivotal movement of the tape head. This arrangement has numerous disadvantages. The structure is quite heavy and becomes out of balance very rapidly with increasing angles. Therefore, the practical limit on the amount of pivot of the tape head is about plus or minus 15°. Because of the weight of the structure, the mass moment of inertia of the structure is relatively high and thus the pivotal movement of the head has a fairly poor response time. In addition, the fabrication cost of the Vought concept is relatively high due at least in part to the need for machining, hardening, and grinding four large diameter ball race grooves and for providing return ways for the steel balls.

The following U.S. patents each disclose a linkage arrangement of the type commonly known as a pantograph used to transfer a geometric shape and (sometimes) to reduce or increase the scale of the shape:

U.S. Pat. No. 1,365,868, granted Jan. 18, 1921, to R. B. Tempest;
U.S. Pat. No. 1,383,914, granted July 5, 1921, to R. C. Emmerling;
U.S. Pat. No. 1,562,859, granted Nov. 24, 1925, to M. M. Anderson;
U.S. Pat. No. 2,289,532, granted July 14, 1942, to H. Thrasher;
U.S. Pat. No. 2,496,781, granted Feb. 7, 1950, to R. M. Eichmann;
U.S. Pat. No. 2,559,222, granted July 3, 1951, to D. M. Moore;
U.S. Pat. No. 2,689,505, granted Sept. 21, 1954, to K. Ossenbach;
U.S. Pat. No. 2,710,452, granted June 14, 1955, to W. M. Garing;
U.S. Pat. No. 2,733,642, granted Feb. 7, 1956, to D. L. Beatty et al;
U.S. Pat. No. 2,734,271, granted Feb. 14, 1956, to W. J. Moriarty;
U.S. Pat. No. 2,806,440, granted Sept. 17, 1957, to E. Schenkengel;
U.S. Pat. No. 2,929,288, granted Mar. 22, 1960, to W. T. Harvey et al;
U.S. Pat. No. 3,199,686, granted Aug. 10, 1965, to A. Wasserman; and
U.S. Pat. No. 3,618,465, granted Nov. 9, 1971, to M. Brochard.

U.S. Pat. No. 1,952,494, granted Mar. 27, 1934, to G. A. Gafford discloses an extensible support for trays, platters, and the like. The support consists of a number of pivotally connected bars.

The above-cited patents and other literature and the prior art that is discussed and/or cited therein should be studied for the purpose of putting the present invention into proper perspective relative to the prior art.

Disclosure of the Invention

A subject of the invention is, in a laminating machine of the type having a head with a presser member that presses a strip of material against a contoured surface to apply it to the surface along a path, apparatus for mounting the head for pivotal movement about the path. According to an aspect of the invention, the apparatus comprises a support member and parallel linkage means. The support member is spaced from the presser member and has a longitudinal axis that is aligned with a point located on the path. The parallel linkage means is pivotably connected to both the support member and the head for maintaining the longitudinal axis of the support member in alignment with said point and for allowing pivotal movement of the head and the pressure member, with respect to the support member, about a line parallel to the path and including said point. Preferably, said point is located essentially midway between the lateral edges of the path. Also preferably, the presser member presses said strip against said surface along a contact line and said point is located on this contact line.

Other features of the invention are the provision of balancing means for keeping the head and presser member in balance in any pivotal position, and the provision of drive means for pivotally moving the head and presser member about said line.

Another subject of the invention is, in a laminating machine of the type having a head with a presser member that presses a strip of material against a contoured surface along a contact line to apply said strip to the surface along a path, apparatus for mounting the head for pivotal movement about the path. According to an aspect of the invention, the apparatus comprises a support member and parallel linkage means. The support member is spaced from the presser member and has a longitudinal axis that is aligned with a point located on the path. The parallel linkage means includes a side member and first and second levers. The side member is laterally spaced from the support member and has a longitudinal axis parallel to the longitudinal axis of the support member. The side member is pivotably connected to the head along a pivot axis. Both of the first and second levers are pivotably connected to both the support member and the side member. The pivotal connections between the support and side members and the levers form a parallelogram two sides of which essentially coincide with the longitudinal axes of the support and side members. A line extending between said pivot axis and said point and lying essentially in the plane of the parallelogram is parallel to the two sides of the parallelogram extending between said longitudinal axes. The longitudinal axis of the support member remains in line with said point, and the head and the presser member may pivot with respect to the support member about a line parallel to the path and including said point. Preferably, said point is located essentially midway between the lateral edges of the path. Also preferably, said point is located on the contact line.

According to another aspect of the invention, the apparatus further comprises balancing means for keeping the head and presser member in balance in any pivotal position. In the preferred embodiment, the balancing means comprises spring means having a first portion fixed with respect to the support member, and second and third portions engaging one of the levers on opposite sides of the pivotal connection between said one lever and the support member.

A feature which the apparatus may be provided with is drive means for pivotably moving the head and presser member about said line. A preferred form for the drive means is power for pivoting one of said levers with respect to the support member.

According to still another aspect of the invention, the parallel linkage means further includes a second side member pivotably connected to the head and at least one of the levers. This second side member has a longitudinal axis parallel to the longitudinal axes of the support member and the first side member. The second side member is laterally spaced from the support member opposite the first side member.

Apparatus constructed according to the invention solves the basic problem discussed above associated with laminating directly onto a contoured surface. This problem is providing pivotal motion of a portion of the laminating machine, the head, about a point that is not available as a location for a pivot joint. The solution to the problem provided by the present invention has a number of advantages over the only other approach to solving the problem known to the applicant—the approach incorporated into the Vought machine, described in some detail above. Apparatus constructed according to the invention may be made considerably more lightweight than the Vought apparatus. This has advantages of contributing to the improved functioning of the overall tape laying operation and of providing a smaller mass moment of inertia so that the pivotal movement of the tape laying head and the apparatus of the invention has a much better response time than may be accomplished with apparatus incorporating the Vought concept. The lower weight of the apparatus of the invention also makes it easier to keep the apparatus in balance as the pivot angle increases. The structure of apparatus of the present invention permits a pivotal movement of the tape head of about plus or minus 45°, in contrast to the plus or minus 15° of the Vought concept. In addition, apparatus constructed according to the present invention has the advantage of being less expensive to manufacture and to maintain.

These and other advantages and features will become apparent from the detailed description of the best mode for carrying out the invention that follows.

BRIEF DESCRIPTION OF THE DRAWINGS

In the drawings, like element designations refer to like parts throughout, and:

FIGS. 4 and 5 are simplified elevational views of the tape head and mounting apparatus shown in FIG. 2, illustrating the tilting of the tape head with respect to the support member.

FIG. 6 is a schematic view of apparatus constructed according to the invention, showing in broken lines the tilted positions of the tape head.

FIG. 7 is similar to FIG. 6 except that it shows a tape head and mounting apparatus of the type included in the Vought machine.

BEST MODE FOR CARRYING OUT THE INVENTION

Figure 1:
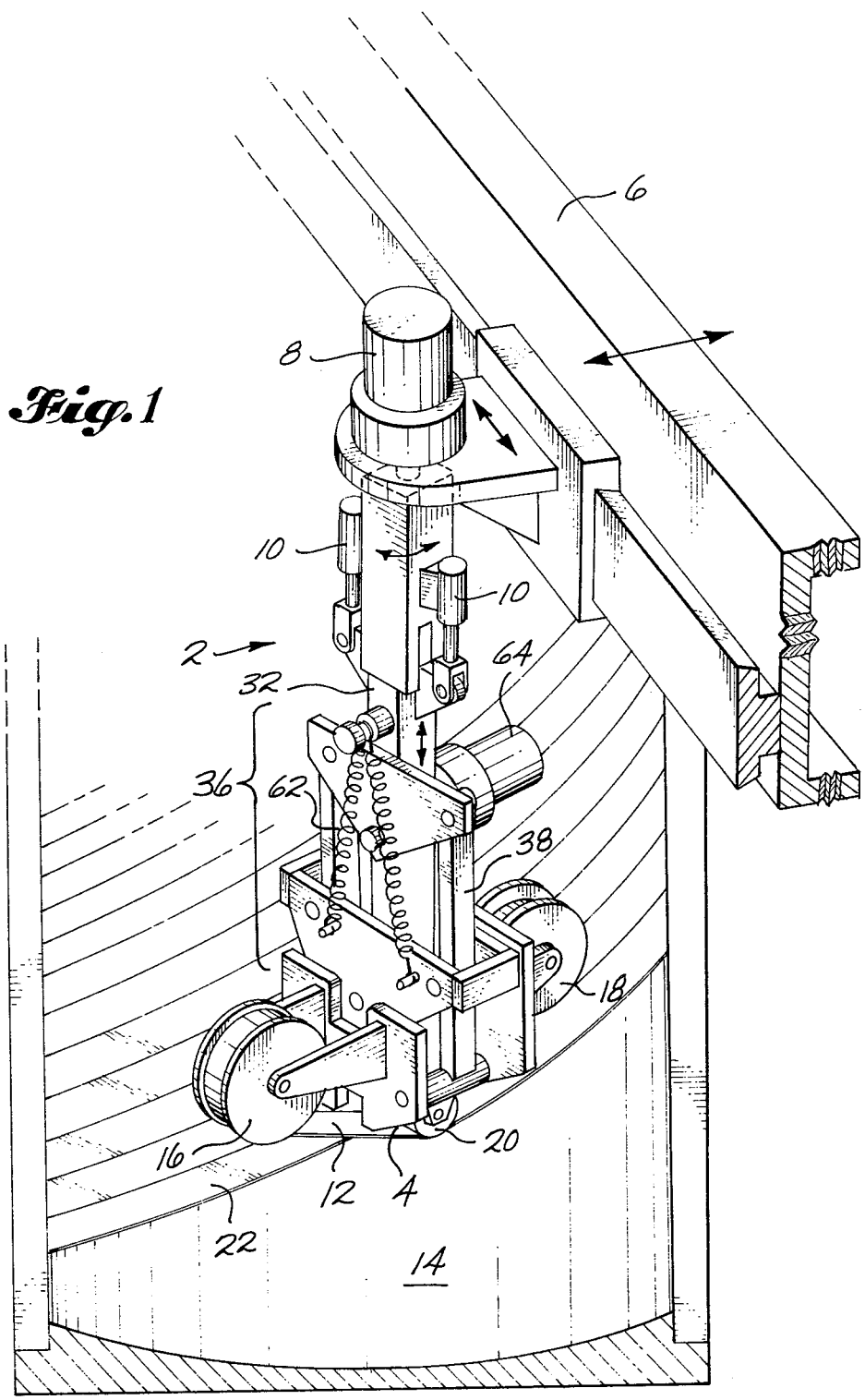
FIG. 1 is a pictorial view of a tape laying machine into which the preferred embodiment of the invention has been incorporated.

The drawings show a tape laying machine 2 into which the preferred embodiment of the apparatus of the invention has been incorporated. The preferred embodiment of the apparatus shown in the drawings is constructed according to the invention and also constitutes the best mode of the invention currently known to the applicant. The illustrated tape laying machine 2 is of the type used for laying composite material tape in the manufacture of aircraft components. The machine 2 is only one example of a type of machine into which apparatus constructed according to the present invention may be incorporated to advantage. The apparatus could also be advantageously incorporated into any type of a laminating machine that applies strips of material onto a contoured surface. In this context, a "contoured surface" is intended to be understood to mean any surface that has changing angles with respect to the direction of movement of the head of the laminating or similar machine.

The machine 2 shown in the drawings has a number of features that are known in the art. The tape head 4 and its supporting structure are carried on a gantry 6 which allows horizontal movement of the head 4 and supporting structure in a direction generally perpendicular to the tape laying path. Side rails (not shown) are provided in such machines for moving the gantry 6, and thus the head 4 and support structure, in a horizontal direction perpendicular to the motion on the gantry 6. This arrangement allows the accurate placing of the tape head at the beginning of each course of the tape path and provides for horizontal movement of the tape head along the courses. Machines of the type shown in FIG. 1 also normally include means for providing vertical movement of the tape head with respect to the surface on which tape is being laid. In the machine 2 shown in the drawings, vertical movement is provided by double-acting hydraulic cylinders 10. These cylinders 10 can lift the head 4 off the mold surface or press the tape 12 being applied against the mold surface 14. A gear reduction motor 8 provides rotational movement of support member 32 about its vertical axis. A tape supply reel 16 and a backing paper take-up reel 18 are mounted on the head 4. The head 4 carries a compaction member or presser member 20 for pressing the tape against the surface 14 to apply it to surface 14 along the tape path. The drawings show the preferred form of the presser member, a roller 20 which is known in the art and does not constitute a part of the present invention. The roller 20 is rotatably mounted on the head 4 to rotate about an axis perpendicular to the direction of travel of the head 4.

The apparatus of the invention mounts the head 4 for pivotal movement about the tape path 22. The apparatus includes a support member that is structurally a part of the support structure or carriage of the machine 2 which is mounted on the gantry 6. The preferred embodiment of the support member is the support post 32 shown in the drawings. The post 32 is mounted on the gantry 6 and is secured against movement relative to the gantry 6 except for the vertical movement necessary for the operation of the machine 2 and provided by cylinders 10 and rotational movement provided by motor 8. Support post 32 is spaced vertically above the presser roller 20.

An important feature of the invention is the alignment of the longitudinal axis of the support post 32 with a point 34 located on the tape path 22. This point 34 in the preferred embodiment is located essentially midway between the lateral edges of the tape path 22 and on the line of contact along which the presser roller 20 presses the tape 12 against the mold surface 14. In other words, in the preferred embodiment, the point 34 is located at essentially the midpoint of this contact line. The central location of point 34 makes maximum use of the pivoting of the head 4 and maximizes the amount of deviation of the curvature of surface 14 from the horizontal to which the machine 2 can adapt. The placing of the longitudinal axis of the support post 32 directly above the presser roller 20 is generally preferred for easier control of the position of point 34, but of course the roller 20 could be positioned in front of, or even behind, the support post 32 in relation to the tape path 22. The orienting of the support post 32 in an essentially vertical position would in most applications be preferred to maximize the smoothness and overall stability of the tape laying operation.

Whatever the exact orientation of the support member 32, its longitudinal axis will at any given moment during the tape laying operation intersect the point 34. It is of course to be understood that point 34 moves along the tape path 22 as the tape head 4 moves along path 22, while remaining in a constant position relative to the lateral edges of path 22 and relative to head 4.

The apparatus of the invention also includes parallel linkage means 36 pivotably connected to both the support member 32 and the tape head 4. The linkage means 36 maintains the longitudinal axis of support member 32 in alignment with point 34 and allows pivotal movement of the head 4 and presser roller 20 with respect to support member 32. This pivotal movement is about a line along the tape path 22, parallel to path 22, and including point 34.

The parallel linkage means 36 preferably includes a first side member or post 38 that is laterally spaced from support member 32. Side member 38 has a longitudinal axis parallel to the longitudinal axis of support member 32. Side member 38 is pivotably connected to tape head 4 along a pivot 46. Linkage means 36 also preferably includes a first upper lever 40 and a second lower lever 42. Both of these levers 40, 42 are pivotably connected to both the support member 32 and the first side member 38.

The pivotal connections 48, 50, 52, 54 between the support and side members 32, 38 and the levers 40, 42 form a parallelogram. Two sides of this parallelogram essentially coincide with the longitudinal axes of the support post 32 and the first side post 38. The two sides of the parallelogram extending between the longitudinal axes of members 32, 38 (the two sides connecting pivot axes 48 and 50, and 52 and 54, respectively) are parallel to a line extending between pivot axis 46 and point 34 and lying essentially in the plane of the parallelogram. This arrangement insures that the longitudinal axis of support post 32 remains in line with point 34 and that tape head 4 and presser roller 20 may pivot with respect to support post 32 about a line parallel to the tape path 22 and including point 34. In the preferred embodiment, this line is the line that runs along the length of the tape path 22 midway between the lateral edges of the tape path 22.

In the preferred embodiment shown in the drawings, the parallel linkage means 36 also includes a second side member or post 44 pivotably connected to the tape head 4 along a pivot axis 56. Second side member 44 is also pivotably connected to at least one of the levers 40, 42. In the first preferred embodiment shown in FIGS. 1, 2, 4, and 5, second side member 44 is pivotably connected to both lower lever 42 and upper lever 40 along pivot axes 58 and 60, respectively. In the modified version of the preferred embodiment shown in FIG. 3, the second side member 44' is pivotably connected to lower lever 42 but not to the upper lever 40'. In either case, the longitudinal axis of the second side member 44, 44' is parallel to the longitudinal axes of the support member 32 and the first side member 38. In addition, the second side member 44, 44' is laterally spaced from the support member 32 opposite the first side member 38. Preferably, the lateral distance between each of the side members 38, 44, 44' and the support member 32 is the same when head 4 is in its center position. Second side member 44 helps to stabilize and balance parallel linkage 36 and head 4, and prevents unwanted pivotal movement of head 4 when roller 20 is not in contact with a mold surface.

Figure 2:
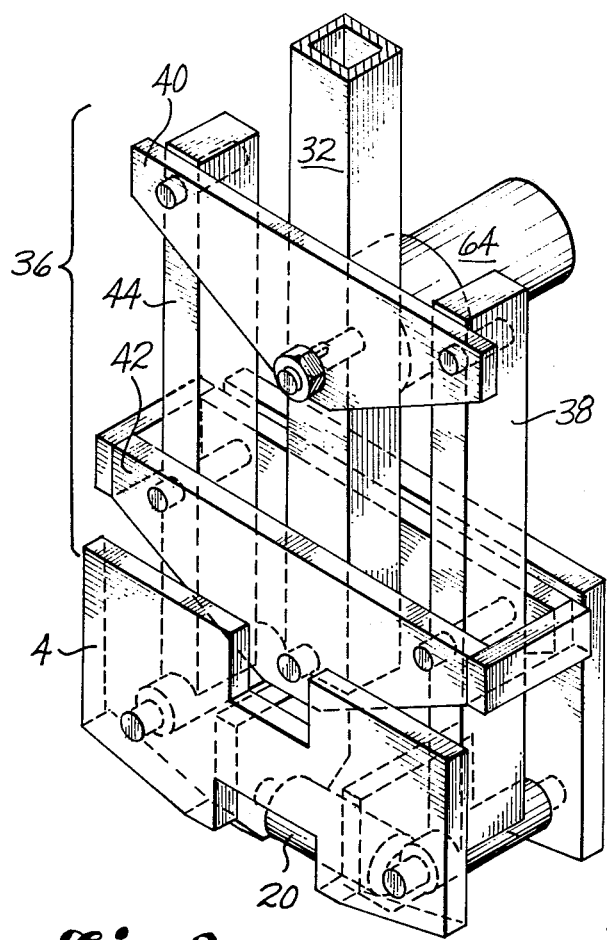
FIG. 2 is a pictorial view of the tape laying head and mounting apparatus shown in FIG. 1.
Figure 3:
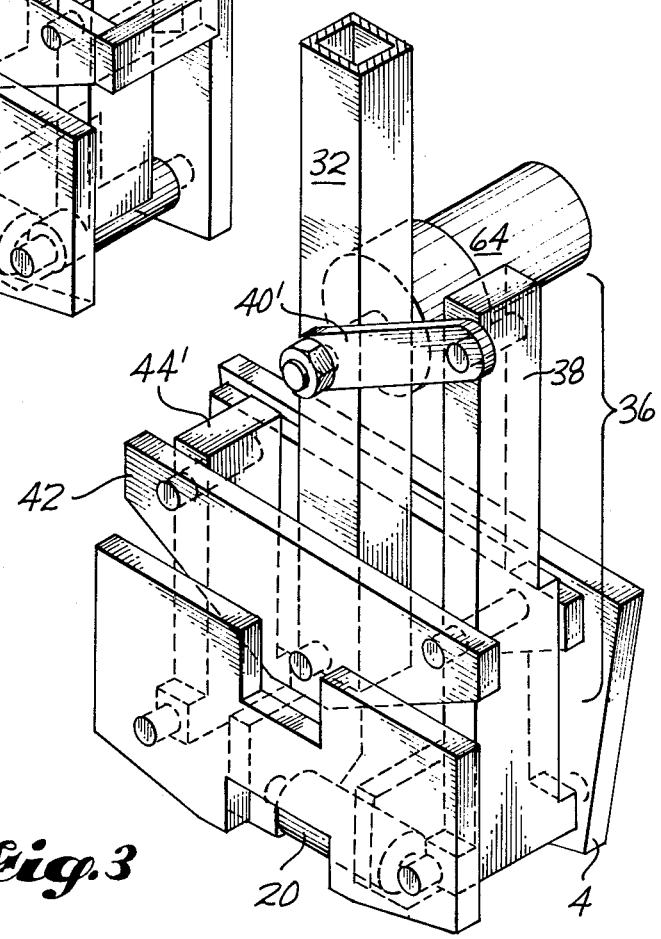
FIG. 3 is like FIG. 2 except that it shows a slightly modified version of the mounting apparatus.

The details of the construction of the support member 32 and the parallel linkage means 36 may of course be varied considerably without departing from the spirit and scope of the present invention. One example of possible modifications is varying the shape of one or both of the levers 40, 42. Two possible forms of the upper lever 40, 40' are shown in FIGS. 2 and 3, respectively. The form of the pivotal connections between members 32, 38, 40, 42, and 44 may also be varied considerably as long as the necessary relative positioning of the pivotal connections is maintained. This relative positioning is described more below.

It is generally preferable to provide the apparatus of the invention with balancing means to keep the tape head 4 and presser roller 20 in balance in any pivotal position. The center position is illustrated in FIGS. 1–3 and in solid lines in FIG. 6. The drawings show the preferred form for the balancing means. Springs 62 have a first portion that is fixed with respect to support post 32. This first portion is one end of each spring 62 that is attached to a projection on support post 32 above lever 40. The upper end of each spring 62 is stationary with respect to support post 32. The opposite end of each of the two springs 62 engages lower lever 42. These lower ends of springs 62 are attached to lever 42 on opposite sides of the pivot axis 52 about which lever 42 pivots with respect to support post 32. These two lower attachments tend to keep the system in balance in any pivotal position.

The apparatus could also be balanced by other means such as by providing counterweights below pivot axes 48 and/or 52. However, springs are preferred to avoid unnecessary weight and inertia which would increase the response time of the mechanism.

Under maximized favorable conditions, a swivel drive to provide pivoting of the head 4 and angle sensors to provide the information for activating the swivel drive would not be necessary. Such favorable conditions would include a lightweight, well balanced head, a wide tape and presser member, and only slowing changing contour angles. The presser roller 20 under such conditions would automatically find its proper angle in relation to the mold surface 14 because of the pressure of the head 4 against surface 14.

Under conditions that are not maximally favorable, it would generally be desirable to provide drive means for pivotally moving the head 4 and presser member 20 about point 34. Such a drive means could be arranged to drive any one of the two levers 40, 42, the two side members 38, 44, or the head itself. However, preferably the drive means pivots one of the levers 40, 42 with respect to support member 32 to in turn pivot the other links of the parallel linkage means and the head 4. In the preferred embodiment shown in the drawings, this drive means is a direct current reduction motor 64 that pivots upper lever 40 about its pivot axis 48. This arrangement has the advantages of simplicity and of consistency with the need for keeping the linkage (36) and head (4) in balance.

FIGS. 4–6 illustrate the operation of the apparatus of the invention. The pivotal connections of the apparatus maintain the longitudinal axis of support post 32 in alignment with the center of the tape path 22 and, in the preferred embodiment, in alignment with point 34 along the line of contact between presser roller 20 and the contoured mold surface 14. While maintaining this alignment, the apparatus permits the pivoting of head 4 and roller 20 with respect to support post 32 and about point 34. This pivoting is essentially a circular movement in a plane normal to the direction of the translational movement of head 4. It serves to keep the roller 20 as nearly parallel as possible to the underlying mold surface 14 and to thereby assure proper application of the tape 12. (The roller 20 preferably has some elasticity to allow it to make a line of contact with a concave or convex surface.)

As noted above, the pivotal axes 48, 50, 52, 54 connecting levers 40 and 42 with support post 32 and side member 38 form a parallelogram. Sides 48–50 and 52–54 of this parallelogram are parallel to a line connecting point 34 and axis 46 and lying in the plane of the parallelogram. (It should be noted that this line 34–36 are the contact line between roller 20 and surface 14 are in the plane of the parallelogram in the preferred embodiment, but in embodiments in which the roller 20 is offset in a forward or backward direction from the support post 32 the line between axis 46 and the pivot point on the contact line would lie in a plane parallel to the plane of the parallelogram). In the plane of the parallelogram and line 34–46, the pattern formed by pivot axes 46 and 56 and point 34 is the same as the pattern formed by pivot axes 54, 58, and 52. In the preferred embodiment in which the second side member 44 is connected to both levers 40, 42 the pattern formed by pivot axes 50, 60, and 48 is also the same. Thus, pivotal motion of either lever 40, 42 generated at pivot axis 48 or pivot axis 52 transfers the circular pivotal motion of the lever 40, 42 through the side members 38, 44 to the tape head 4. This provides the desired circular movement of tape head 4 and presser roller 20 in a plane normal to the direction of travel of support member 32 and about point 34. The provision of two levers 40, 42 insures that the side members 38, 44 will remain parallel to center support post 32 and that support post 32 will remain aligned with point 34.

FIG. 6 is a schematic representation of the movement of the apparatus of the invention. FIG. 7 is a schematic representation of the operation of apparatus of the type included in the Vought machine, described above. FIGS. 6 and 7 illustrate the relative degrees of pivotal movement that may be obtained with apparatus constructed according to the invention and apparatus such as the Vought apparatus. The attainment of 45 degrees of pivot in either direction versus the 15 degrees attainable with known apparatus is a significant improvement and one of the major advantages of apparatus constructed according to the present invention.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the present invention as defined by the following claims.

What is claimed is:

1. In a laminating machine of the type having a head with a presser member that presses a strip of material against a contoured surface to apply it to the surface along a path, apparatus for mounting the head for pivotal movement about the path, said apparatus comprising:
- a support member spaced from the presser member and having a longitudinal axis that is aligned with a point located on the path; and
- parallel linkage means pivotably connected to both the support member and the head for maintaining the longitudinal axis of said support member in alignment with said point and for allowing pivotal movement of the head and the presser member, with respect to said support member, about a line parallel to the path and including said point.

2. Apparatus as described in claim 1, in which said point is located essentially midway between the lateral edges of the path.

3. Apparatus as described in claim 1, in which the presser member presses said strip against said surface along a contact line, and said point is located on said contact line.

4. Apparatus as described in claim 3, in which said point is located at essentially the midpoint of said contact line.

5. Apparatus as described in claim 1, further comprising balancing means for keeping the head and presser member in balance in any pivotal position.

6. Apparatus as described in claim 1, further comprising drive means for pivotally moving the head and presser member about said line.

7. In a laminating machine of the type having a head with a presser member that presses a strip of material against a contoured surface along a contact line to apply said strip to the surface along a path, apparatus for mounting the head for pivotal movement about the path, said apparatus comprising:
- a support member spaced from the presser member and having a longitudinal axis that is aligned with a point located on the path; and
- parallel linkage means including a side member laterally spaced from the support member and having a longitudinal axis parallel to the longitudinal axis of the support member, said side member being pivotably connected to the head along a pivot axis; and
- first and second levers both of which are pivotably connected to both the support member and the side member;

wherein the pivotal connections between said support and side members and said levers form a parallelogram two sides of which essentially coincide with said longitudinal axes, and a line extending between said pivot axis and said point and lying essentially in the plane of said parallelogram is parallel to the two sides of said parallelogram extending between said longitudinal axes, so that the longitudinal axis of the support member remains in line with said point and the head and the presser member may pivot with respect to said support member about a line parallel to the path and including said point.

8. Apparatus as described in claim 7, in which said point is located essentially midway between the lateral edges of the path.

9. Apparatus as described in claim 7, in which said point is located on said contact line.

10. Apparatus as described in claim 9, in which said point is located at essentially the midpoint of said contact line.

11. Apparatus as described in claim 7, further comprising balancing means for keeping the head and presser member in balance in any pivotal position.

12. Apparatus as described in claim 11, in which the balancing means comprises spring means having a first portion fixed with respect to the support member, and second and third portions engaging one of the levers on opposite sides of the pivotal connection between said one lever and the support member.

13. Apparatus as described in claim 7, further comprising drive means for pivotally moving the head and presser member about said line.

14. Apparatus as described in claim 13, in which the drive means comprises power means for pivoting one of said levers with respect to the support member.

15. Apparatus as described in claim 7, in which the parallel linkage means further includes a second side member pivotably connected to the head and at least one of said levers and having a longitudinal axis parallel to the longitudinal axes of the support member and the first side member, said second side member being laterally spaced from the support member opposite the first side member.

* * * * *

UNITED STATES PATENT AND TRADEMARK OFFICE
CERTIFICATE OF CORRECTION

PATENT NO. : 4,461,669

DATED : July 24, 1984

INVENTOR(S) : Helmut Dontscheff

It is certified that error appears in the above-identified patent and that said Letters Patent are hereby corrected as shown below:

Column 3, line 4, "pressure" should be --presser--.

Column 3, line 61, --means-- should be inserted following "power".

Column 6, line 29, --axis-- should be inserted following "pivot".

Column 8, line 21, "are" should be --and--.

Signed and Sealed this

Second Day of April 1985

[SEAL]

Attest:

DONALD J. QUIGG

*Attesting Officer*    *Acting Commissioner of Patents and Trademarks*